Figure 1:
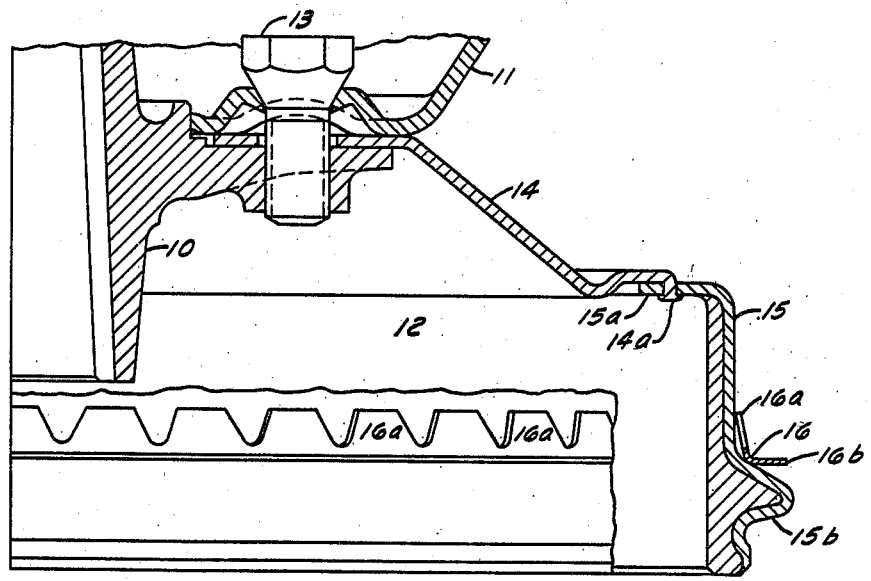

May 23, 1944.     H. J. HORN     2,349,658
BRAKE DRUM
Filed June 7, 1941

INVENTOR.
HARRY J. HORN.
BY
Carroll R. Faber

Patented May 23, 1944

2,349,658

UNITED STATES PATENT OFFICE 2,349,658

BRAKE DRUM

Harry J. Horn, Lansing, Mich., assignor to Motor Wheel Corporation, Lansing, Mich., a corporation of Michigan Application June 7, 1941, Serial No. 396,976

15 Claims. (Cl. 188—218)

This invention relates to brake drums and more particularly to the combination with a brake drum ring of a novel form of vibration dampener and novel means for mounting the dampener upon the brake drum ring.

The principal object of the invention is to minimize audible vibrations in brake drums used in motor vehicles and the like.

As is well known to those skilled in the art, under certain operating conditions, brake drums produce objectionable noises sometimes referred to as "howls," "squeals," "groans," and the like. These noises are most commonly caused by vibrations set up in the brake drum ring when the brake shoes are applied to the ring to produce the braking effect.

The character of the noise produced in this way depends upon the frequency of the vibration. The frequency of the vibration is largely determined by the speed of rotation of the ring at the time the shoes are applied and/or the distortion of the ring resulting from the application of the shoes.

Thus, it will be seen that a brake drum which is free from objectionable vibrations under one set of operating conditions may produce extremely objectionable vibrational noises under another set of conditions. Accordingly, to satisfactorily dampen the objectionable vibrations, provision must be made to accomplish that result under varying conditions and circumstances. That is to say, there must be taken into account the bell mouthing of the drum, the expansion and contraction thereof, and the tendency of the drum to go out of round or assume an egg shape, at times.

The present invention provides means for dampening vibrations under all of the varying conditions mentioned above. This is accomplished by mounting on the external surface of the drum ring an annulus that closely engages the ring at all times. That is to say, the annulus is so constructed and arranged upon the drum ring that it "follows" the ring, regardless of the shape taken by the ring, maintaining its close engagement therewith for all shapes. The annulus comprising the vibration dampener is constructed of such material and such configuration as to have a different natural vibration frequency than the brake ring upon which it is mounted. Thus, the vibration dampener functions to quench the vibrations of the brake ring and eliminate the objectionable noises which would otherwise result therefrom.

One of the outstanding advantages of the present invention resides in the fact that the said annulus which comprises the vibration dampener may also serve as a brake drum seal. Thus, the single structure serves a dual function.

Figure 4:
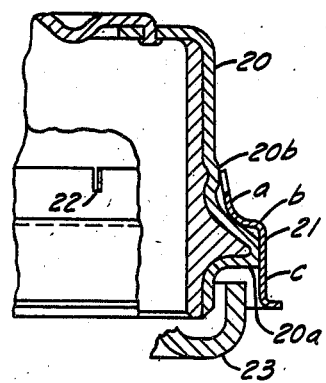
Figure 5:
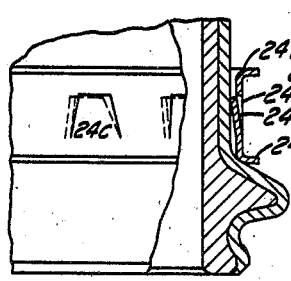
Figure 6:
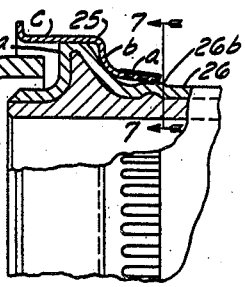
Figure 7:

The preferred embodiments of the invention, as well as a more detailed statement of the objects and advantages thereof, are set forth in the following description, which should be read in connection with the accompanying drawing, wherein:

Figure 1 is a fragmentary cross-sectional view of a brake drum embodying one form of the invention;

Figures 2 to 6 inclusive are fragmentary cross-sectional views of a brake drum showing alternative embodiments of the invention; and Figure 7 is a sectional view taken on the line 7—7 of Figure 6.

The structure shown in Figure 1 comprises a hub 10, a fragment of a wheel body 11, a brake drum 12, and cap screws 13 for demountably securing the wheel body 11 to the hub 10. The brake drum 12 is preferably secured to the hub 10 in a conventional manner by means of rivets, not shown.

The brake drum 12 comprises a supporting web 14, a brake ring 15 and a vibration dampener 16. The ring and web are permanently connected to each other by integral rivets 14a formed at the periphery of the web and which extend through cooperating openings in the flange 15a of the ring 15.

The brake ring 15 is here shown as being of the composite type wherein an inner cast iron liner is secured to an outer or enclosing steel shell. Adjacent its open end the ring 15 is provided with a reinforcing rib 15b.

The vibration dampener 16 is a metal annulus of generally L-shape in cross-section. One leg of the L is notched to provide a plurality of circumferentially spaced apart fingers 16a which resiliently engage the external surface of the ring. The other leg 16b of the annulus engages the rib 15b, extends radially outwardly from the ring 15, and serves to reinforce the leg which includes the fingers 16a.

It will be readily apparent that the leg of the annulus 16 which includes the fingers 16a is more flexible than leg 16b. The annulus 16 is so formed that the normal minimum internal circumference of the fingers 16a, taken together, is slightly less than the normal external circumference of the ring 15 in the zone of engagement shown in Figure 1. The fingers 16a are sufficiently flexible so that the annulus 16 can be pressed onto the ring 15 into the position shown in Figure 1. When in that position the fingers 16a closely and resiliently engage the ring 15.

The entire annulus 16 is made of relatively flexible material, and has a natural vibration frequency different than the vibration frequency of the ring 15. The fingers 16a are of sufficient length and flexibility so that they can change shape with the drum without being permanently distorted and without losing their close fitting engagement with the ring 15. The radially outwardly extending leg 16b of the annulus provides a rigid base for the fingers which localizes the flexing in the fingers and prevents the annulus as a whole from expanding—thereby serving to maintain the fingers in close fitting engagement with the ring.

Figure 2:
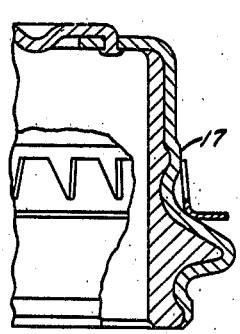

The alternative structure shown in Figure 2 is identical to the structure shown in Figure 1 except for the provision on the outer surface of the brake ring of a raised annular seat 17 upon which the vibration dampener is mounted. This arrangement makes it somewhat easier to mount the vibration dampener upon the brake ring, eliminating the necessity for forcing the dampener from one edge of the ring to beyond the center of the ring, as would otherwise be necessary.

Figure 3:
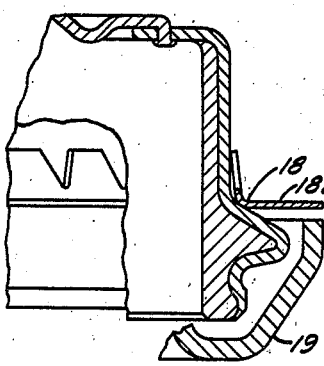

The structure shown in Figure 3 is identical to the structure shown in Figure 1 except that in this embodiment the leg 18b of the annulus 18 extends radially outwardly a sufficient distance to cooperate with a backing plate 19 and the reinforcing rib of the brake ring to form a seal for the brake drum. Thus, without impairing the function of the annulus 18 as a vibration dampener, it is formed to serve the additional function of a seal.

Figure 4 illustrates a slightly modified form of brake ring 20 and an alternative form of vibration dampener 21. The ring is formed with a raised seat 20b and a reinforcing rib 20a. The dampener 21 is made up of three annular portions a, b and c. Annular portion a is of an internal circumference slightly less than the external circumference of seat 20b. It is provided with slits 22, in the free edge thereof at spaced points about its circumference, to increase its flexibility. The portion b of dampener 21 contacts the side of reinforcing rib 20a and extends radially outwardly to reinforce annular portion a of dampener 21. Annular portion c of dampener 21 extends axially outwardly over and preferably in contact with ring rib 20a; and cooperates with rib 20a and a backing plate 23 to form a seal for the brake drum.

The brake drum structure shown in Figure 5 is identical to the structure shown in Figure 1 except for the vibration dampener 24. It is of U shape in cross-section, having a central web portion and leg portions 24a and 24b. The web portion is sheared to form integral tongues 24c which are bent radially inwardly and which together have an internal circumference slightly less than the external circumference of the brake ring. The tongues 24c are, of course, more flexible than the remainder of the annulus and they are reinforced by the legs 24a and 24b. Leg 24a preferably contacts the reinforcing rib of the brake ring as shown.

The structure shown in Figures 6 and 7 is identical to that shown in Figure 4 except for the details of the construction of the vibration dampener 25. According to this embodiment the annular portion a of dampener 25 is provided with a plurality of axially extending corrugations to increase its flexibility. The inner circumference of the corrugated portion a of dampener 25 is slightly less than the external circumference of the annular seat 26b of brake ring 26. Annular portions b and c of the annulus 25 are similar to the corresponding portions of annulus 21 shown in Figure 4 and cooperate in the same manner with brake ring rib 26a and backing plate 27 to form a seal for the brake drum.

In each of the constructions which have been described the annulus which forms the vibration dampener has a different natural vibration frequency than the drum upon which it is mounted. Each has a relatively flexible portion which closely engages the brake ring and a relatively non-flexible portion which also engages the brake ring and reinforces the relatively flexible portion. In every case the more flexible portion of the annulus is of such character that it can "follow" the brake ring without relaxing its close engagement thereof.

Thus, in each form of the invention, the annulus serves as a vibration dampener for the brake ring. It may, as shown and described, also serve to form a seal for the brake drum.

The scope of the invention is indicated in the appended claims.

I claim:

1. The combination with a brake drum ring of a vibration dampener therefor comprising an annulus mounted upon the external surface of the ring, said annulus including a relatively flexible portion and a relatively nonflexible portion, said relatively flexible portion resiliently engaging the external surface of the ring in circumferentially spaced zones and having a normal minimum internal circumference slightly less than the circumference of the engaged portion of the ring, said relatively non-flexible portion serving to reinforce the relatively flexible portion and maintain it in close fitting engagement with the ring said annulus being secured to said ring solely by means of the resilient engagement of the ring by said relatively flexible portion of the annulus.

2. The combination defined in claim 1 wherein the relatively flexible portion of the annulus comprises a plurality of circumferentially spaced apart fingers extending generally in an axial direction.

3. The combination defined in claim 1 wherein said relatively flexible portion comprises a plurality of integral tongues cut from the body of the annulus.

4. The combination with a brake drum ring of a vibration dampener therefor comprising an annulus of U-shape in cross-section, the web of said annulus including portions more flexible than the remainder of the annulus, said more flexible portions closely engaging the external surface of the ring.

5. The combination defined in claim 4 wherein the legs of the annulus extend radially outwardly from the ring.

6. The combination defined in claim 4 wherein said more flexible portions comprise circumferentially spaced apart tongues severed from the web portion of the annulus and having their free extremities located radially inwardly from the remainder of the web portion.

7. The combination with a brake drum ring of a vibration dampener therefor comprising an annulus mounted upon the external surface of the ring, said annulus including a relatively flexible portion and a relatively non-flexible portion integrally connected together, said relatively flexible portion extending generally in an axial direction and resiliently engaging the external surface of the brake ring in circumferentially spaced zones, said relatively non-flexible portion extending at least in part in a generally radial direction and serving to reinforce the relatively flexible portion and to maintain it in close fitting engagement with the ring.

8. The combination defined in claim 7 wherein said relatively non-flexible portion also contacts the brake ring and in a region remote from the contact between the ring and the relatively flexible portion.

9. The combination defined in claim 7 wherein said dampener is secured to the brake ring solely by means of the resilient engagement of the latter by the former.

10. The combination with a brake drum ring of a vibration dampener therefor comprising an annulus including a generally axially extending portion provided with radially inwardly inclined fingers resiliently engaging the external surface of the ring in circumferentially spaced zones, said annulus being secured to said ring solely by means of the resilient engagement of the ring by said fingers.

11. The combination with a brake drum ring of a vibration dampener therefor comprising an annulus mounted on the external surface of the ring, said annulus including a relatively flexible portion extending generally in an axial direction and provided with circumferentially spaced apart radially inwardly extending projections which resiliently engage the external surface of the ring, said annulus being secured to said ring solely by means of the aforesaid resilient engagement of the ring by said projections.

12. The combination with a brake drum ring of a vibration dampener therefor comprising an annulus mounted on the external surface of the ring, said annulus including a relatively flexible portion and a relatively non-flexible portion, said relatively flexible portion resiliently engaging the external surface of the ring in circumferentially spaced zones and having a normal minimum internal circumference slightly less than the circumference of the engaged portion of the ring, said relatively non-flexible portion serving to reinforce the relatively flexible portion and maintain it in close fitting engagement with the ring, said annulus being secured to said ring solely by means of the resilient engagement of the ring by said relatively flexible portion of the annulus, the portion of the ring engaged by the relatively flexible portion of the annulus being of greater circumference than the surface of the ring adjacent thereto.

13. The combination with a brake drum ring of a vibration dampener therefor comprising an annulus mounted on the external surface of the ring, said annulus including a relatively flexible portion and a relatively non-flexible portion, said relatively flexible portion resiliently engaging the external surface of the ring in circumferentially spaced zones and having a normal minimum internal circumference slightly less than the circumference of the engaged portion of the ring, said relatively non-flexible portion serving to reinforce the relatively flexible portion and maintain it in close fitting engagement with the ring, said annulus being secured to said ring solely by means of the resilient engagement of the ring by said relatively flexible portion of the annulus, said annulus being mounted upon the brake drum adjacent one edge thereof and said relatively non-flexible portion of the annulus being formed to cooperate with the brake drum backing plate to provide therewith a seal for the drum.

14. The combination with a brake drum ring of a vibration dampener therefor comprising an annulus mounted upon the external surface of the ring, said annulus including a relatively flexible portion and a relatively non-flexible portion, said relatively flexible portion being provided with slits in the free edge thereof and resiliently engaging the external surface of the ring in circumferentially spaced zones, said flexible portion having a normal minimum internal circumference slightly less than the circumference of the engaged portion of the ring, said relatively non-flexible portion serving to reinforce the relatively flexible portion and maintain it in close fitting engagement with the ring, said annulus being secured to said ring solely by means of the resilient engagement of the ring by said relatively flexible portion of the annulus.

15. The combination with a brake drum ring of a vibration dampener therefor comprising an annulus mounted upon the external surface of the ring, said annulus including a relatively flexible portion and a relatively non-flexible portion, said relatively flexible portion being provided with corrugations and resiliently engaging the external surface of the ring in circumferentially spaced zones, said flexible portion having a normal minimum internal circumference slightly less than the circumference of the engaged portion of the ring, said relatively non-flexible portion serving to reinforce the relatively flexible portion and maintain it in close fitting engagement with the ring, said annulus being secured to said ring solely by means of the resilient engagement of the ring by said relatively flexible portion of the annulus.

HARRY J. HORN.